UNITED STATES PATENT OFFICE.

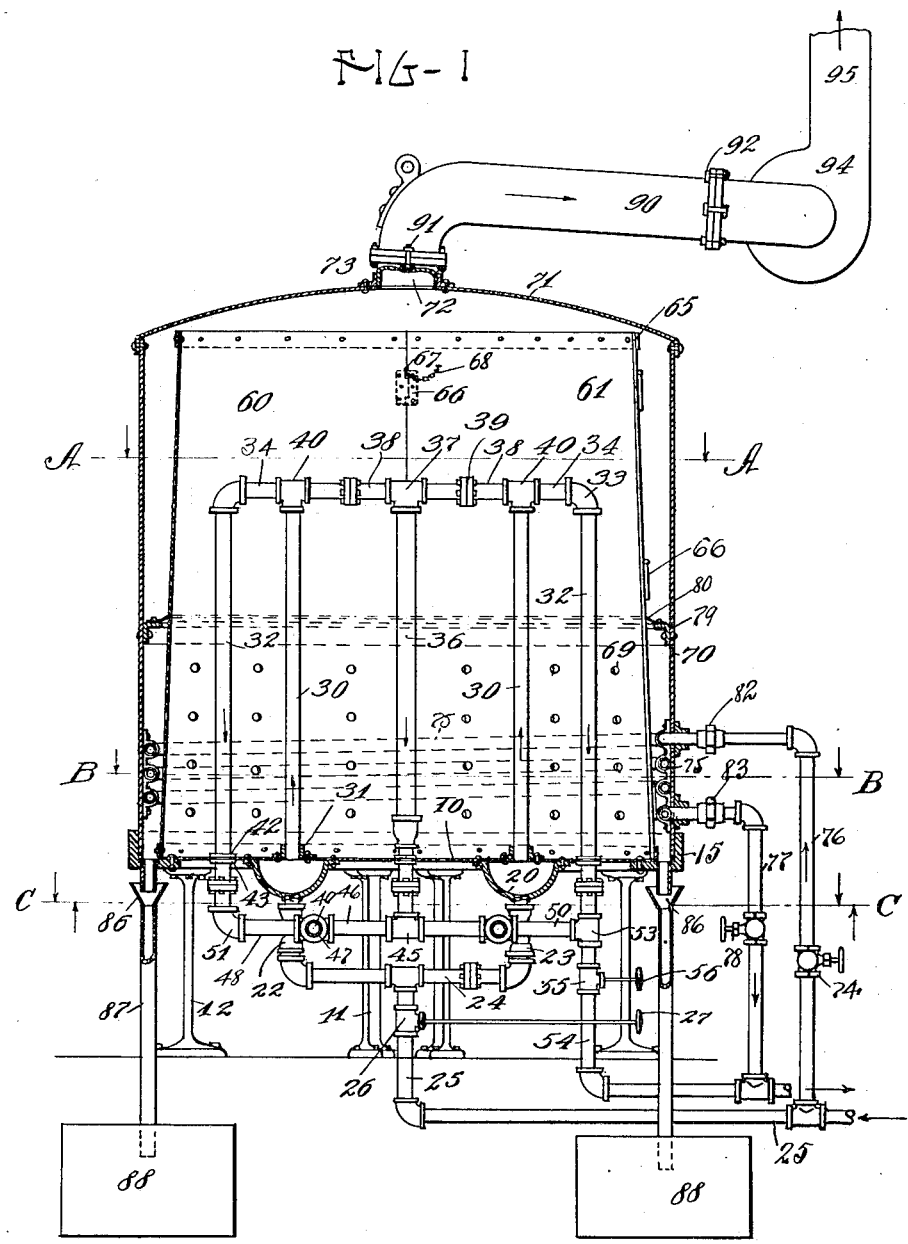

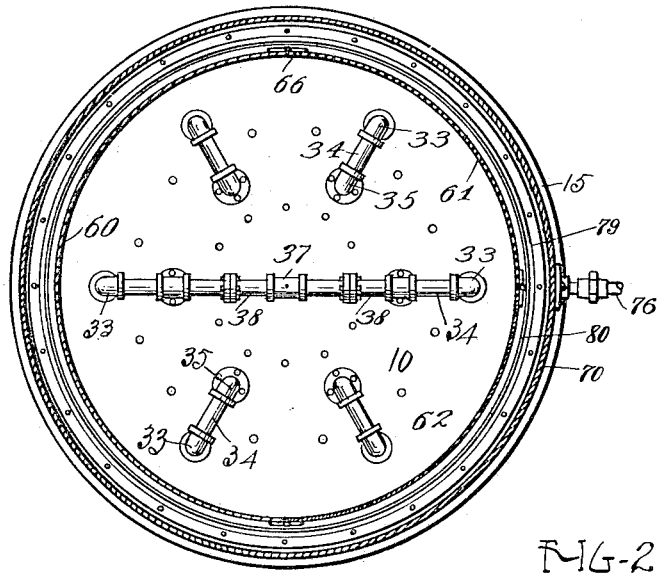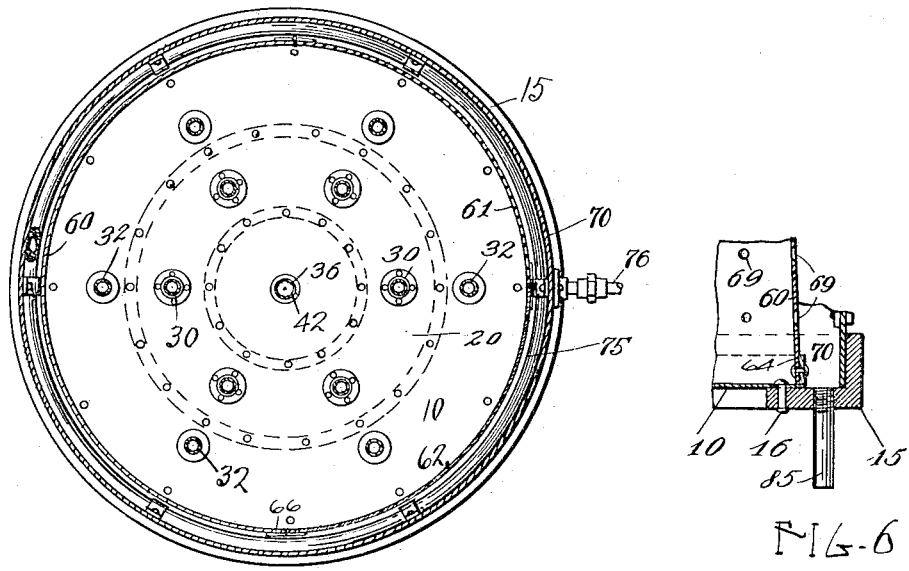

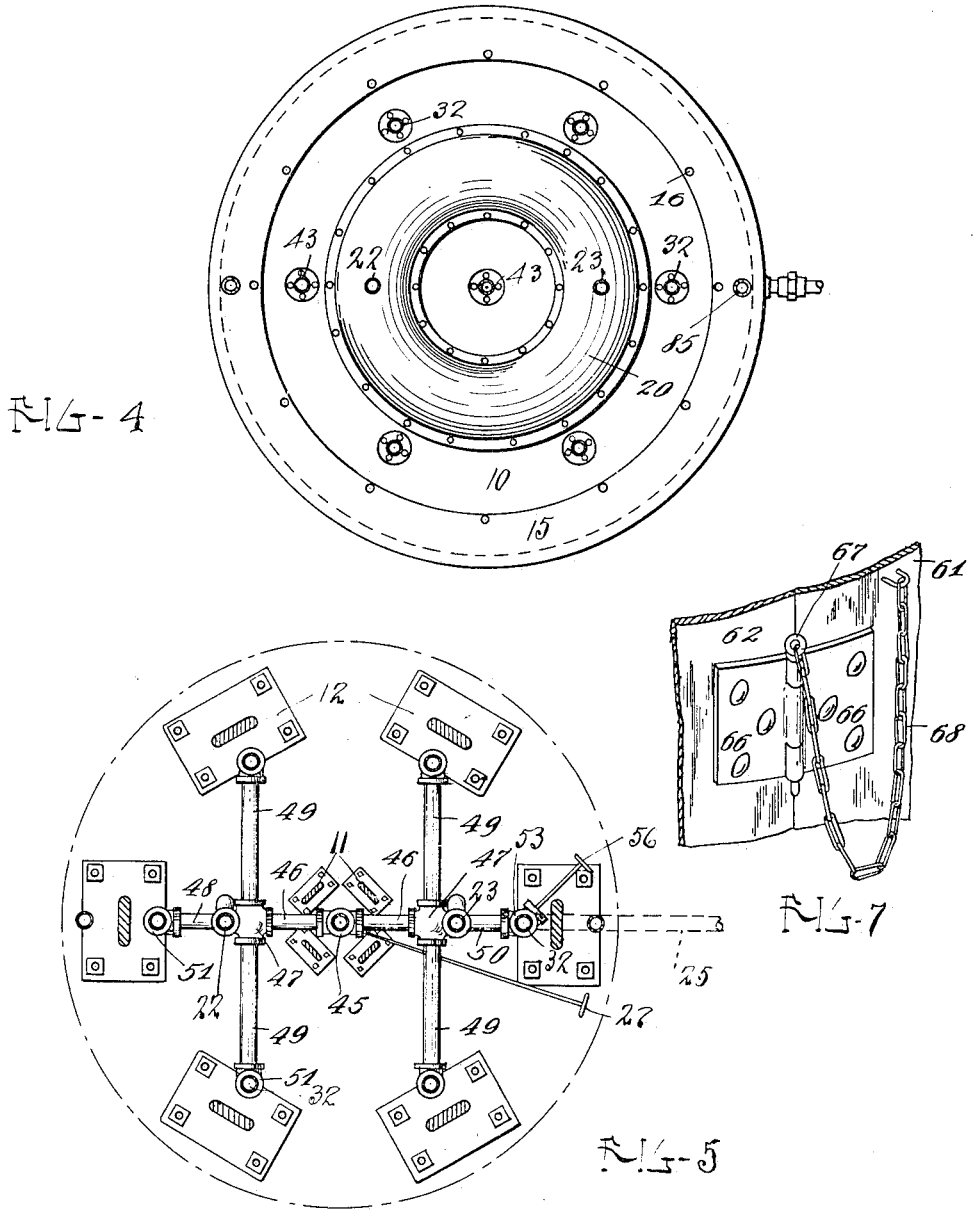

GOTTLIEB F. METZGER, OF LAKEWOOD, OHIO.

APPARATUS FOR TREATING ANIMAL MATTER CONTAINING MOISTURE, OIL, OR GREASE.

1,091,524. Specification of Letters Patent. Patented Mar. 31, 1914.

Application filed September 20, 1911. Serial No. 650,470.

*To all whom it may concern:*

Be it known that I, GOTTLIEB F. METZGER, a citizen of the United States, residing at Lakewood, in the county of Cuyahoga and State of Ohio, have invented a certain new and useful Improvement in Apparatus for Treating Animal Matter Containing Moisture, Oil, or Grease, of which the following is a full, clear, and exact description, reference being had to the accompanying drawings.

This invention relates to an apparatus for giving a preliminary treatment to animal matter containing moisture, oil and grease, to remove a large part of such contained substances and leave the material in proper condition for treatment in a percolator.

In carrying out this invention, the ground animal material (fish, fish offal, etc., for example), is placed within a two-walled receptacle and subjected to the action of heat by a specially formed steam radiator without the steam contacting with the material. While the material is thus heated it is subjected to the action of a fan to carry off the vapor generated, and the oil and water which exudes as the material dries, passes through perforations in inner shell of the receptacle, into the space between the walls, whence it drains into a suitable collector.

The process is hereinafter more fully described in connection with the description of the apparatus, and the essential features of the process and apparatus are set out in the claims.

In the drawings, Figure 1 is a vertical central section through my apparatus. Figs. 2 and 3 are horizontal sections, looking downward. Fig. 6 is a detail showing the lines A—A and B—B of Fig. 1. Fig. 4 is a horizontal section on the line C—C of Fig. 1, looking upward. Fig. 5 is a horizontal section on the line C—C of Fig. 1 looking downward. Fig. 6 is a detail showing the construction near the bottom edges of the two shells. Fig. 7 is a detail illustrating the hinge, connecting the portions of the inner shell.

I will describe first the apparatus shown in the drawings, and then take up the description of the process.

In the drawings, 10 represents a circular bottom for the receptacle which is made of sheet metal and supported by suitable standards; as shown, by the several standards 11, below the center of the bottom and standards 12, arranged in a circular course nearer the outer edge of the bottom. At such outer edge, the bottom is reinforced by a ring 15, which may be a suitable casting riveted to the bottom, as shown in 16.

Riveted to the under side of the bottom 10, is an annular trough 20. This trough, with the bottom above it, makes an annular distributing pipe for the live steam, which thence passes into the radiator above the bottom. As shown in the drawing, the steam is conveyed to the trough at two points thereon by pipes 22 and 23 which are connected by elbows and a union with a pipe 24, with which connects main steam pipe 25. A suitable valve 26 operated by handle 27 is interposed between pipes 25 and 24.

Leading upward from the bottom 10, above the trough 20, are a series of vertical radiating pipes 30. The drawing shows six of these pipes. Near their lower ends they are provided with flanged collars 31, which are riveted to the base plate 10.

32 indicates a series of radiator pipes which stand vertically, and radially beyond the corresponding pipes 30. Each pipe 30 is connected with corresponding pipe 32 by a short horizontal pipe 34, and the steam passing up the pipe 30 passes down the pipe 32. Two of the pipes 30 which stand diametrically opposite are also connected with a central downward-extending pipe 36. This pipe is provided with a T 37, which, by means of pipes 38 and unions 39, is connected with Ts 40 on the upper ends of the two pipes 30 referred to. Accordingly these particular pipes 30 are connected with pipe 36 and also with two pipes 32. The other pipes 30 have elbows 35 at their upper ends which connect with the horizontal pipes 34. All of the pipes 32 have elbows 33 at their upper ends, connected with the corresponding horizontal pipes. The pipes 32 and the central pipe 36 pass through the floor 10, making a tight joint therewith by reason of the locknuts 42 and 43 screwing on each pipe and clamping against the top and the bottom of the floor.

The above described steam pipes above the floor 10, constitute the steam radiator heretofore mentioned. Below the floor, the pipes 32 and the pipe 36 are connected together for a common return for the steam. As shown, the central pipe 36 has a T 45 on its lower end which connects with pipes 46 leading in opposite directions, and each of these pipes 46 is provided with a four-way fitting 47, from which lead continuing pipes 48 and 50 and four transverse pipes 49. Each of these transverse pipes 49, as well as the pipe 48, are provided at their ends with elbows 51, connecting with the corresponding pipe 32. The pipe 50 is shown as connecting with a T 53, which is connected with one of the pipes 32 and leads downward to the main discharge pipe 54. A valve 55 is placed on this pipe below the T 53, and is operated by a handle 56.

The system of piping described makes a simple and at the same time, a very effective steam radiator. The live steam controlled by valve 26 is admitted to all of the pipes 30 and traveling up them, passes outwardly or inwardly and then downwardly, and finally out through the pipe 54, under the control of the valve 55. The radial arrangement of the pipes not only enables easy access from the outside for purposes of removing the material, but provides for an even and efficient heating of the material.

Resting on the bottom 10 and surrounding the radiator is a suitable inner shell made of segments of sheet metal, 60, 61 and 62, which together make an approximately cylindrical shell, open at the top, the shell being slightly tapered inwardly toward the top. As shown the member 60 is approximately semi-cylindrical, whereas each of the members 61 and 62 are quadrant sections; these members are braced at their bottoms by reinforces 64 riveted thereto, and at the top by reinforces 65 riveted to them. The members are connected by hinges 66, having removable pins 67. One strap of such hinge is riveted to one member of the shell and the other strap to the adjacent member, and the pin 67 passed loosely through the alined ears. Accordingly, the removal of the pins enables the shell to be disconnected at each of its junction points, and the sections may then be swung apart on the remaining hinges; or, if desired, the shell can be disconnected entirely. To prevent loss of the pins 67, they are provided with chains 68 permanently securing them to one of the adjacent portions of the shell. The inner shell described is provided with a series of perforations 69, leading into the annular space between this inner shell and an outer shell. These perforations flare outwardly (see Fig. 6), to prevent clogging.

The outer shell above referred to is designated 70. It is preferably cylindrical and is somewhat larger than the inner shell. At its upper end, the outer shell has riveted to it a crown sheet 71, which is provided with a central manhole 72, surrounded by a flanged sleeve 73, riveted to the crown sheet. This outer shell is suitably supported by the bottom. As shown, it rests upon the reinforcing ring 15, with which the bottom may be provided, the upper flange of this ring making a comparatively tight connection with the shell.

Within the outer shell near its lower end is a coil of pipe 75. This coil makes several turns about the shell and is connected at its upper turn by a pipe 76 with the live steam pipe 25, while the lowermost coil is connected by a pipe 77 with the return steam pipe 54. Suitable valves 74 and 78 in these pipes 76 and 77 furnish means for controlling the coil 75. Above the coil 75 is a suitable diaphragm between the shells. This is shown as consisting of an annular angle iron 79 riveted to the outer shell and a rubber ring 80 carried by the angle iron and bearing against the inner shell. The perforations 69 in the inner shell are opposite the space between the bottom and the diaphragms 79 and 80, wherefore the liquid passing through these openings 69 goes into an annular chamber provided for it by the shells. The tapered form of the inner shell enables the rubber ring 80 to conveniently clear it when the outer shell is withdrawn, as it may be when the unions 82 and 83, in the pipes 76 and 77, are disconnected.

Screwing into ring 15 and extending through it in registration with the annular space between the shells are discharge pipes 85. These lead downward into the mouths of open funnels 86, which are at the upper ends of pipes 87, discharging into tanks 88. Accordingly, the oil or moisture passing through opening 69 into the annular space runs down through these exit passageways into tanks 88.

90 in Fig. 1 illustrates an elbow pipe connected at one end by hinged bolts 91, with the manhole sleeve 73, and at the other end by hinged bolts 92 with the entrance pipe for a suitable fan 94. This fan serves to draw up the vapor resulting from drying the moist material, discharging such vapor through a suitable exit pipe 95.

In carrying out my process, with the above described apparatus, I proceed as follows: I disconnect at 91 and 92, the elbow pipe 90, and move it up out of the way, leaving the manhole 72 open. I open the valves 26 and 55, and 74 and 78, admitting live steam to the radiator and to the coil 75. When the air in the shell has reached a temperature of about 212° Fahr., I throw in the ground material, through the manhole 72. This material will frequently be dead fish, fish offal or other oily refuse. When the inner shell is nearly filled, the pipe 90 is replaced, bolts 91 and 92 made tight and the heat continued for a suitable time.

I have found that I obtain satisfactory results by using steam from 60 to 70 lbs. pressure, resulting in the heating of the material from 212° to 230°, and continuing the operation for two or three hours. During such operation the heat of the internal radiator and of the surrounding coil releases a large portion of the water in the material, which passes outwardly through the openings 69 into the annular space between the shells and pass downwardly through the pipes 85 and 87. At first only water or oily water, passes through such pipes, but as the operation continues, the discharge becomes rich in oil and is then caught in tanks 88 and saved. The outer coil 75 insures a thorough heating of the material adjacent to the perforations 69, so that this material does not interfere with the passage of oil from nearer the center of the mass. When the heating is about half over I start the fan, which draws off the vapor being formed in the vessel.

In my process of heating the material without moistening it or subjecting it to pressure, I drive out the liquid constituents without agitating the material. I thus avoid causing fine particles of this material to be carried over into the oil which would otherwise result. The agitation caused by the steam under pressure in the old digesting process, moreover, co-mingles the blood and flesh and liberates ammonia and phosphoric acid, which are hereby lost, reducing the value of the resultant material. This is avoided by my process.

When the liquid stops running through the pipes 85, the steam valve 74 is closed, the unions 82 and 83 and fan pipe 90 disconnected, and the whole outer shell raised, as by suitable block and fall, clear of the inner shell. After this outer shell is raised, I continue the drying by the internal radiator for a short time at a less temperature, and then shut off the steam altogether and remove the pins from some of the hinges and swing back the members of the inner shell. The material from which the oil has been extracted, then stands in a sort of cake resting on the floor around the radiating pipes. This material can be easily removed by means of hoes, rakes or other suitable tools, drawing it radially upward. On removal it may drop into a suitable conveyer (not shown) which carries it to the percolator, where it receives the subsequent treatment with naphtha, which extracts the remaining oil therefrom, leaving the final product in excellent condition for fertilizer when properly mixed with diluting material.

It will be seen that my process of drying the material without admitting moisture to it, has many advantages over digesting it by admitting live steam directly to it. In such digesting process, the moisture added with the steam must be subsequently removed, thereby increasing the cost of operation. In operating on fish material, the digesting, as I have discovered, disintegrates the fish into such small particles that a material portion of it passes with the oil through the sieves and diminishes its value.

Among the advantages of my process may be mentioned: First, great saving in the original cost of construction. Since there is an entire absence of pressure (except within the radiator) at all parts of the process, the shells may be made much lighter than when they contain steam under pressure. Second, there is a great saving in coal consumed during operation, as no moisture is added, which has to be subsequently removed. Third, there is a saving of a considerable percentage of ammonia and phosphoric acid as compared with the digesting process, for in that process the admittance of steam directly into the raw material agitates it and mingles the blood and flesh so that ammonia and phosphoric acid are liberated and drawn off or evaporated. Fourth, the product produced by my process is greater in quantity and superior in quality to that produced by the former processes with which I have been familiar, as more oil is produced and it is saved from deterioration by small particles of digested fish, and the fertilizer is left freer from oil and richer in ammonia and phosphoric acid.

Having thus described my invention, what I claim is:—

1. In an apparatus of the class described, the combination of a base for a receptacle, a steam radiator comprising pipes leading from such base, an inner perforated shell around such pipes and consisting of sections hinged together with removable hinge pins, an outer shell, and means for conveying liquid from the space between the shells.

2. In an apparatus of the class described, the combination of a base, a steam radiator consisting of pipes rising therefrom, an inner shell adapted to surround such pipes and being perforated, and a removable outer shell.

3. In an apparatus of the class described, the combination of a base, a steam radiator carried thereby and fed from beneath the base, an inner perforated shell resting on the base and composed of sections removably connected together, an outer shell supported by the base, and an exhaust fan connected with the upper part of the outer shell.

4. In an apparatus of the class described, the combination of a base and an annular trough making a steam distributing pipe, pipes rising above the base and in communication with such trough, communicating descending pipes passing through the base, a perforated shell surrounding such pipes, and an outer shell surrounding the perforated shell and making a connection with the base.

5. In an apparatus of the class described, the combination of a base, a steam radiator carried thereby and extending above the base, an inner perforated shell surrounding the radiator and resting on the base, an outer shell connected with the base, and means for draining liquid from the lower part of the space between the shells.

6. An apparatus for treating animal matter containing oil, consisting of a two-walled receptacle, the outer shell being imperforate and removable as a unit and the inner shell perforated and made of separable sections, of a steam radiator within the receptacle, means for conducting steam to such radiator, and a draining pipe leading from the space between the shells.

7. An apparatus for carrying out the process described consisting of a base and an annular trough connected therewith, forming a steam distributing pipe, a series of pipes rising from such trough above the base and around about a center, a central downtake pipe, a series of outer downtake pipes arranged radially beyond the pipes first mentioned, a perforated shell adapted to be carried by the base and surrounding the pipes, an outer imperforate shell surrounding the perforated shell and spaced beyond it, means for draining the liquid from the space between the shells, and means for exhausting vapor from the upper portion of the outer shell.

8. In an apparatus of the class described, the combination of a receptacle having an internal radiator and a shell surrounding the same, an outer shell surrounding the shell first mentioned but spaced from it, and a heating coil carried by the outer shell.

9. In an apparatus of the character described, the combination of a base, a radiator carried thereby, an inner perforated shell surrounding the radiator, the outer shell surrounding the inner shell, and a circumferential coil of pipe carried on the inner wall of the outer shell.

10. In an apparatus of the class described, the combination of a base, a radiator rising therefrom consisting of piping, means for conveying steam to such radiator, an inner perforated shell carried by the base, an outer imperforate shell carried by the base and spaced from the inner shell, a diaphragm between the two shells, a coil of pipe carried by the outer shell between the base and diaphragm, and means for conveying steam to such coil.

11. In an apparatus of the class described the combination of a base having an upward flange adjacent to its outer edge, an outer shell resting within such flange and removable upwardly therefrom, an inner perforated shell formed of a plurality of separable parts, a heating apparatus within the inner shell, and means for conducting away liquid from between the shells.

In testimony whereof, I hereunto affix my signature in the presence of two witnesses.

GOTTLIEB F. METZGER.

Witnesses:
ALBERT H. BATES,
J. B. HULL.